United States Patent [19]

Ondrus et al.

[11] Patent Number: 5,338,609
[45] Date of Patent: Aug. 16, 1994

[54] FRACTIONAL MELT FLOW RATE POLYMER POWDERS AND PROCESS FOR THEIR PREPARATION

[75] Inventors: Daniel J. Ondrus, West Chester; Manfred Heimberg, Cincinnati, both of Ohio

[73] Assignee: Quantum Chemical Corporation, Cincinnati, Ohio

[21] Appl. No.: 66,358

[22] Filed: May 21, 1993

Related U.S. Application Data

[63] Continuation of Ser. No. 784,862, Oct. 30, 1991, abandoned.

[51] Int. Cl.$^5$ .............................................. B32B 5/16
[52] U.S. Cl. .................................... 428/402; 526/279
[58] Field of Search ........................ 526/279; 428/402

[56] References Cited

U.S. PATENT DOCUMENTS

| | | |
|---|---|---|
| 3,225,018 | 12/1965 | Zutty . |
| 3,392,156 | 7/1968 | Donaldson . |
| 3,422,049 | 1/1969 | McClain . |
| 3,432,483 | 3/1969 | Peoples et al. . |
| 3,746,681 | 7/1973 | McClain . |
| 4,983,675 | 1/1991 | Ishino et al. . |

FOREIGN PATENT DOCUMENTS

| | | | |
|---|---|---|---|
| 5609591 | 8/1981 | Japan | 526/279 |
| 61-188406 | 8/1986 | Japan | 526/279 |
| 2238009 | 9/1990 | Japan | 526/279 |

OTHER PUBLICATIONS

Two abstracts of Japanese Publication 2185549 (Showa Elec. Wire KK.); publication date Jul. 19, 1990; Derwent Publications, Ltd., London, GB.

*Primary Examiner*—Joseph L. Schofer
*Assistant Examiner*—N. Sarofim
*Attorney, Agent, or Firm*—Gerald A. Baracka; William A. Heidrich

[57] ABSTRACT

The present invention relates to fractional melt flow rate powders wherein the particles are substantially spherical in shape and range in size from about 10 up to about 200 microns. The invention also relates to a process whereby a dispersible olefin copolymer resin can be converted into a microfine powder with reduced melt index. The process entails dispersing a molten olefin copolymer resin containing silane functionality in a liquid medium in the presence of a nonionic surfactant and catalyst and, after the melt flow rate is reduced to the desired level, cooling the dispersion to below the melt point of the olefin polymer.

20 Claims, No Drawings

FRACTIONAL MELT FLOW RATE POLYMER POWDERS AND PROCESS FOR THEIR PREPARATION

CROSS REFERENCE TO RELATED APPLICATION

This is a continuation of U.S. patent application Ser. No. 07/784,862, filed Oct. 30, 1991 now abandoned.

BACKGROUND OF THE INVENTION

1. Field of the Invention

The present invention relates to fractional melt flow rate polymer powders, i.e., powders of polymers which have a melt index less than 1, and which are spherical or substantially spherical in shape. The invention also relates to a process for producing the improved polymer powders having reduced melt flow rates.

2. Description of the Prior Art.

The use of thermoplastic resin powders is well documented in the prior art. For example, powdered thermoplastic resins in dry form have been used to coat articles by dip coating in either a static or fluidized bed, by powder coating wherein the powder is applied by flame or electrostatic spraying or dusting. Powders can also be applied in dispersed form, by roller coating, spray coating, slush coating, and dip coating substrates such as metal, paper, paperboard, and the like. Powders are also widely employed for conventional powder molding processes, e.g., rotational molding. Still other applications for powders include use as paper pulp additives; mold release agents; additives to waxes, paints, caulks, and polishes; binders for non-woven fabrics; etc.

Besides the physical properties of the powder, which are dictated by the resin being used, the size and shape of the particles are the other major properties which influence the selection of a powder for a particular application. These latter properties are primarily a function of the process by which the powders are prepared, which can include mechanical grinding, solution processes and dispersion processes. Particle size is determined using U.S. Standard Sieves or light scattering techniques and, depending on the method used, will be reported in mesh size or microns. The inverse relationship between the sieve size (mesh number) and particle size (in microns) is well documented and conversion tables are available. The shape of the particles is ascertained from photomicrographs of the powders. Particle shape has a marked influence on the bulk density of the powder and its handling properties.

For most effective fluidization and dry spraying, it is generally considered advantageous to use powders which have a fairly narrow particle size distribution and wherein the particles are spherical in shape. Powders produced by mechanical grinding or pulverization, which are typically irregular in shape and generally have quite broad particle size distributions, are not well suited for fluidization and dry spraying. While the particles of powders produced by solution processes are less irregular than those obtained by mechanical means, they are still not spherical.

Powders obtained using dispersion techniques, such as those described in U.S. Pat. Nos. 3,422,049 and 3,746,681, wherein the particles produced are spherical in shape and fall within a relatively narrow size range are most advantageously employed for fluidization and dry spraying. These processes involve subjecting a synthetic organic polymeric thermoplastic resin in molten form and about 0.8 to 9 parts by weight of water per part of resin to vigorous agitation in the presence of from about 2 to 25 parts by weight per 100 parts of resin of a water-soluble block copolymer of ethylene oxide and propylene oxide having a molecular weight above about 3500 and containing at least about 50% by weight of ethylene oxide in the absence of an organic solvent for the polymer and at a pressure between about 6 and 120 atmospheres such that a fine dispersion is produced and then cooling said dispersion to below the softening temperature of the said resin.

A continuous process for the preparation of finely divided polymer particles is disclosed in U.S. Pat. No. 3,432,483. The process comprises the sequential steps of feeding to the polymer, water and a water-soluble block copolymer of ethylene oxide and propylene oxide surfactant into a dispersion zone; vigorously agitating the mixture under elevated temperature and pressure to form a dispersion of the molten polymer; withdrawing a portion of the dispersion and cooling to a temperature below the melting point of said polymer to form solid, finely divided polymer particles in the dispersion; reducing the pressure of said cooled dispersion to atmospheric pressure; separating the solid polymer particles from the surfactant solution phase and washing; drying the washed polymer particles; and recovering dry, finely divided powder.

While it is possible to produce fine powders of a broad spectrum of polyolefin polymers utilizing the above-described procedures, dispersion processes cannot be used to produce fine powders of resins with melt indexes below about 1. In the practice of the dispersion procedures, as the melt index of the resins being used approaches 1, it becomes increasingly difficult to achieve the type of dispersion necessary to form fine powders. Dispersions having droplets of the size necessary for the production of fine powders cannot be formed with fractional melt flow rate resins, i.e., resins having a melt index less than 1. This is believed to be due, in part, to the high molecular weights of such resins. The relationship of melt flow rate to molecular weight and the inability to form dispersions suitable for the production of fine powders with high melt flow rate resins is discussed in U.S. Pat. No. 3,746,681.

In view of the desirable physical properties of low melt flow rate resins, it would be highly advantageous if fine powders of such resins could be produced. It would be particularly advantageous if these fine low melt flow rate resin powders could be produced utilizing a dispersion process and if the particles had a relatively narrow particle size distribution and were spherical in shape. Coatings obtained using such powders would be expected to have improved thermal stability, improved creep resistance, improved chemical resistance and other desirable properties. These and other advantages are achieved by the present invention wherein fractional melt flow rate olefin copolymer powders are produced.

Ethylene/vinylalkoxysilane copolymers are described in U.S. Pat. Nos. 3,225,018 and 3,392,156. It is also disclosed in U.S. Pat. No. 3,392,156 that ethylene/vinyltrialkoxysilane copolymers can be used in finely divided form where the copolymer has an average size of less than about 10 mesh and preferably in the range of about 150 to 2000 microns. While the reference states that the finely divided material may be prepared by mechanical grinding, solution or dispersion techniques or other methods, no details are provided and no powders are prepared. Furthermore, it is a requirement of the process that the products be mechanically worked to obtain a reduction of melt index and an increase in stress cracking resistance. Melt indexes obtained after mechanical working range from 7.95 to zero in the examples.

SUMMARY OF THE INVENTION

We have now unexpectedly discovered a process whereby novel fractional melt flow rate polymer powders, i.e., powders with melt flow rates less than 1, can be produced. The particles of these fractional melt flow rate powders are substantially spherical in shape and fall within a relatively narrow particle distribution range. Typically, 80 percent or more of the particles will be in the range of about 10 to about 200 microns. For the process of the invention, a dispersion is first formed using an olefin copolymer resin which has a melt flow rate such that acceptable dispersions can be produced, i.e., dispersions wherein a droplet size necessary to produce fine powders can be formed, and the melt flow rate of the resin is lowered to less than 1 in the course of the powder-forming process.

More specifically, the process comprises the sequential steps of: combining an olefin copolymer having a melt index greater than 1 with 4 to 50 percent, based on the weight of the olefin copolymer, of a nonionic surfactant which is a block copolymer of ethylene oxide and propylene oxide, 0.001 to 10 percent, based on the weight of the olefin copolymer, of a catalyst selected from the group consisting of organic bases, mineral or carboxylic acids, organic titanates and complexes or carboxylates of lead, cobalt, iron, nickel and tin, and a polar liquid medium which is not a solvent for the olefin copolymer and which does not react with any of the foregoing ingredients under the conditions employed, the weight ratio of the polar liquid medium to the olefin copolymer ranging from 0.8:1 to 9:1; heating the mixture to a temperature above the melting point of the olefin copolymer; dispersing the mixture to form droplets of the desired size; maintaining the dispersion for a period of time sufficient to reduce the melt index of the olefin copolymer; cooling the dispersion to below the melting point of the olefin copolymer; and recovering the olefin copolymer powder.

Olefin copolymers employed for the process of the invention are derived from α-olefins having from 2 to 8 carbon atoms and unsaturated alkoxysilanes of the formula

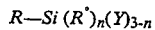

$$R{-}Si(R^\circ)_n(Y)_{3-n}$$

where R is an ethylenically unsaturated hydrocarbon radical having from 2 to 6 carbon atoms, R° is a hydrocarbon radical having from 1 to 10 carbon atoms, Y is an alkoxy group having from 1 to 4 carbon atoms and n is an integer from 0 to 2. The unsaturated alkoxysilane may be copolymerized with the α-olefin or grafted onto an α-olefin homopolymer. The olefin copolymers may additionally have a vinyl ester of a $C_{2-6}$ alkyl carboxylic acid, a $C_{1-6}$ alkyl acrylate or a $C_{1-6}$ alkyl methacrylate polymerized with the α-olefin and unsaturated alkoxysilane. Vinyltrialkoxysilanes are particularly useful unsaturated alkoxysilanes.

DETAILED DESCRIPTION OF THE INVENTION

This invention relates to fractional melt flow rate powders of olefin copolymer resins wherein the particles are spherical or substantially spherical in shape and fall within a relatively narrow particle distribution range. For this invention the terms melt index and melt flow rate are used interchangeably and these values are expressed in grams/10 minutes and determined in accordance with ASTM D1238. The term fractional melt flow rate refers to melt flow rates which are less than 1. The invention also relates to a dispersion process for producing the above-described fractional melt flow rate olefin copolymer powders and other powders with reduced melt flow rates.

The significance of this invention lies in the ability to produce, using a dispersion procedure, fractional melt flow rate powders wherein the particles are spherical or substantially spherical in shape and wherein 80 percent or more of the particles range in size from 10 microns to 200 microns. Small particles size powders of this type are sometimes referred to as microfine powders. Heretofore, it has not been possible to obtain fine powders comprised of spherical particles with fractional melt flow rate resins due to the inability to form acceptable dispersions with these polymers. The molecular weight of resins having melt flow rates less than 1 preclude the formation of dispersions with droplets of the requisite size to produce fine powders and, in some instances, it is not possible to even form a suitable dispersion. Heretofore, it has only been possible to obtain powders of fractional melt flow rate resins by grinding or by using solution processes. However, the particles of powders produced by grinding or in solution processes are not spherical and can have a broad size distribution which limits their utility for fluidization and spray coating operations.

With the process of this invention, dispersions are formed using resins which are readily dispersible, i.e., which have melt flow rates greater than 1, and the melt index of the resin is subsequently lowered to fractional values while it is in a suitably dispersed state. To accomplish this, specific olefin copolymers, which have an unsaturated alkoxysilane incorporated therein by copolymerization or grafting, are employed.

In general, the polymers useful for the practice of this invention are olefin copolymers and include randomly copolymerized products and grafted products. More specifically, the olefin copolymers are comprised of α-olefins having from 2 to 8 carbon atoms and unsaturated alkoxysilanes of the formula

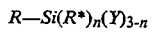

$$R{-}Si(R^*)_n(Y)_{3-n}$$

where R is an ethylenically unsaturated hydrocarbon radical having from 2 to 6 carbon atoms, R* is a hydrocarbon radical having from 1 to 10 carbon atoms, Y is an alkoxy group having from 1 to 4 carbon atoms and n is an integer from 0 to 2. The olefin copolymers must be readily dispersible in the liquid medium employed for the process which will be described in more detail to follow. Thus, the olefin copolymers will have melt flow rates greater than 1, and more typically greater than about 3. While the melt index may range as high as 500, it generally does not exceed about 300 and, more preferably, will be less than 100.

Random copolymers of ethylene and unsaturated alkoxysilanes, such as vinyltrialkoxysilanes, are known. Such copolymers can be obtained in accordance with any of the recognized procedures such as those described in U.S. Pat. Nos. 3,225,018 and 3,392,156. Generally, these copolymerizations are carried out at high pressure and temperature in the presence of a free radical initiator. Copolymers wherein an unsaturated alkoxysilane is grafted onto an olefin polymer backbone are also known and can be prepared in accordance with conventional procedures. Free radical initiators, such as peroxides, are generally used to facilitate grafting alkoxysilanes onto the polyolefins.

The unsaturated alkoxysilane will constitute from about 0.25 to 20 percent by weight and, more preferably, from about 0.5 to 10 percent by weight of the olefin copolymer. In a highly useful embodiment of this invention, the unsaturated alkoxysilane is a vinyltrialkoxysilane, i.e., where R is a vinyl group and n is 0. It is especially advantageous to utilize vinyltrimethoxysilane or vinyltriethoxysilane, i.e., where R is a vinyl group, n=0 and Y is methoxy or ethoxy, respectively. Olefin copolymers derived from $C_{2-3}$ $\alpha$-olefins are especially useful. Minor amounts of higher olefins may be present, particularly if the unsaturated alkoxysilane is grafted. While polyethylene is most commonly grafted, copolymers of ethylene with propylene, butene-1 and hexene-1 are also suitable. When the $\alpha$-olefin and unsaturated alkoxysilane are copolymerized, ethylene is preferably employed particularly when the alkoxysilane is vinyltrimethoxysilane or vinyltriethoxysilane. When the olefin copolymer is comprised of an $\alpha$-olefin and unsaturated alkoxysilane only, the $\alpha$-olefin will constitute from 80 to 99.75 weight percent and, more preferably, 90 to 99.5 weight percent of the polymer.

One or more other monomers may be included with $\alpha$-olefin and unsaturated alkoxysilane. Such comonomers include vinyl esters of $C_{2-6}$ aliphatic carboxylic acids, $C_{1-6}$ alkyl acrylates, and $C_{1-6}$ alkyl methacrylates. The comonomers can be copolymerized with the unsaturated alkoxysilane and $\alpha$-olefin or the unsaturated alkoxysilane can be grafted onto a copolymer form by copolymerizing an $\alpha$-olefin and the comonomer. When comonomers are present, the olefin copolymer will comprise 55 to 99.5 percent $\alpha$-olefin, 0.25 to 20 percent unsaturated alkoxysilane and 0.25 to 45 percent comonomer(s). More commonly, the copolymers will contain 55 to 99 percent $\alpha$-olefin, 0.5 to 40 percent unsaturated alkoxysilane and 0.5 to 40 percent comonomer. Preferred vinyl esters of $C_{2-6}$ aliphatic carboxylic acids include vinyl acetate and vinyl butyrate. Ethyl acrylate and n-butyl acrylate are particularly useful $C_{1-6}$ alkyl acrylate comonomers. Ethyl methacrylate is a particularly useful $C_{1-6}$ alkyl methacrylate comonomer.

For the process, the olefin copolymer is charged to the reactor with a polar liquid medium, a nonionic surfactant and catalyst capable of bringing about melt index reduction of the copolymer and a dispersion is formed in accordance with conventional dispersing procedures known to the art. The dispersing apparatus may be any device capable of delivering sufficient shearing action to the mixture at elevated temperature and pressure. Conventional propeller stirrers designed to impart high shear commercially available for this purpose can be used. The reactor may also be equipped with baffles to assist in dispersion. The particle size and distribution of particles is dependent on the shearing action which, in turn, is related to the stirrer design and rate of stirring. Agitation rates can vary over wide limits but the speed of the stirrer will usually be controlled so that the tip speed is between about 500 and 3500 ft/min and, more commonly, 750 and 3000 ft/min. A higher tip speed is generally required for batch operation, usually 2500–3000 ft/min. Tip speeds for continuous procedures will most generally be between 750 and 2500 ft/min.

The dispersion process is typically conducted in an autoclave since this permits the process to be conducted at elevated temperature and pressure. In the usual batch conduct of the process, all of the ingredients are charged to the autoclave and the mixture is heated to a temperature above the melting point of the olefin copolymer. While the temperature will vary depending on the specific copolymer used, it will typically range from about 90° C. to 250° C. Since the fluidity of polymers is temperature related, it may be desirable to carry out the process at temperatures substantially above the melting point of the olefin copolymer to facilitate dispersion formation. Stirring is commenced after the desired temperature is reached. While dispersions of the desired droplet size are rapidly achieved, stirring is continued while maintaining the temperature for a period of time sufficient to obtain the desired decrease in melt index. This will vary depending on the copolymer being used, the temperature and amount and type of catalyst, and other process variables but generally will range from about 5 minutes to about 2 hours. Most generally, the stirring is maintained for a period from 10 to 30 minutes. The melt index reduction cannot be accomplished at too rapid a rate as this can prevent the formation of a suitable dispersion. While the mechanism of the melt index reduction is not completely understood, it is believed that some crosslinking occurs to increase the molecular weight of the copolymer.

A polar liquid medium which is not a solvent for the olefin copolymer and which does not react under the process conditions is employed to form the dispersions. These polar mediums are hydroxylic compounds and can include water, alcohols, polyols and mixtures thereof. The weight ratio of the polar liquid medium to olefin copolymer ranges from about 0.8:1 to about 9:1 and, more preferably, from 1:1 to 5:1. It is particularly advantageous to use water as the dispersing medium or to use a liquid medium where water is the major component. The pressure of the process is not critical so long as a liquid phase is maintained and can range from about 1 up to about 217 atmospheres. The process can be conducted at autogenous pressure or the pressure can be adjusted to exceed the vapor pressure of the liquid medium at the operating temperature. Most generally, with aqueous dispersions the pressure will range from about 5 to 120 atmospheres.

To obtain suitable dispersions with the olefin copolymers, one or more dispersing agents are employed for the process. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The amount of nonionic surfactant employed can range from about 4 to 50 percent, based on the weight of the olefin copolymer. Most preferably, the nonionic surfactant is present from about 7 to 45 percent, based on the weight of the polymer.

Useful nonionic surface active agents of the above type are manufactured and sold by BASF Corporation, Chemicals Division under the trademark Plutonit. These products are obtained by polymerizing ethylene oxide on the ends of a preformed polymeric base of polyoxypropylene. Both the molecular weight of the polyoxypropylene base and the polyoxyethylene segments can be varied to yield a wide variety of products. One such compound found to be suitable for the practice of the process of this invention is the product designated as F-98 wherein a polyoxypropylene of average molecular weight of 2,700 is polymerized with ethylene oxide to give a product of molecular weight averaging about 13,500. This product contains 20 weight percent propylene oxide and 80 weight percent ethylene oxide. Other effective Pluronic ® include F-88 (M.W. 11,250, 20% propylons oxide, 80% ethylene oxide), F-108 (M.W. 16,250, 20% propylene oxide, 80% ethylene oxide), and P-85 (M.W. 4,500, 50% propylene oxide, 50% ethylene oxide). These compounds, all containing at least about 50 weight percent ethylene oxide and having molecular weights of at least 4,500, are highly effective as dispersing agents for the aforementioned olefin copolymers.

It is also possible to employ products sold under the trademark Terrenit which are prepared by building propylons oxide block copolymer chains onto an ethylenediamine nucleus and then polymerizing with ethylene oxide. Tetronic ® 707 and Tetronic ® 908 are most effective for the present purposes. Tetronic ® 707 has a 30 weight percent polyoxypropylene portion, of 2,700 molecular weight, polymerized with a 70 weight percent oxyethylene portion to give an overall molecular weight of 12,000. Tetronic ® 908, on the other hand, has a 20 weight percent polyoxypropylene portion, of 2,900 molecular weight, polymerized with an 80 weight percent oxyethylene portion to give an overall molecular weight of 27,000. In general, useful Tetronic ® surfactants have molecular weights above 10,000 and contain a major portion by weight of ethylene oxide.

A catalyst capable of lowering the melt index of the olefin copolymer is also necessarily present. These catalysts generally include organic bases, mineral and $C_{2-22}$ carboxylic acids, adducts of unsaturated carboxylic acids or anhydrides, organic titanates and complexes or carboxylates of lead, cobalt, iron, nickel, zinc and tin. Lauryl amine, acetic acid, azelaic acid, lauric acid, palmitic acid, stearic acid, polyethylene grafted with maleic arthydride, acrylic acid or methacrylic acid, polypropylene grafted with maleic anhydride, acrylic acid or methacrylic acid, dibutyltin dilaurate, dibutyltin maleate, dibutyltin diacetate, dibutyltin dioctoate, stannous acetate, stannous octoate, lead naphthenate, zinc caprylate, and cobalt naphthenate are illustrative of the catalysts which can be used. Organometallic silanol condensation catalysts are known in the art for crosslinking alkoxysilane polymers. The catalysts are present from about 0.001 to 10 percent, based on the weight of the olefin copolymer. More preferably, the catalyst will be employed at a level from 0.01 to 4 percent, based on the weight of the polymer. Dialkyl tin carboxylates, especially dibutyltin dilaurate and dibutyltin maleate and $C_{2-18}$ aliphatic monocarboxylic acids, especially acetic acid and stearic acid, are particularly effective catalysts for this invention.

The process of the invention may also be conducted in a continuous manner. If continuous operation is desired, the essential ingredients are continuously introduced to the system while removing from another part of the system the dispersion of the reduced melt flow rate polymer. The ingredients may be separately charged or two or more may be combined for introduction.

The powders produced by the process of this invention will have 80 percent or more of the particles ranging in size from 10 microns to 200 microns. In an especially useful embodiment, the particle size will range from 20 to 150 microns.

To produce powders having the desired particle size distribution, a dispersion having droplets of the desired size must be formed. This requires a proper selection of the operating conditions, such as, temperature and agitation, as well as proper selection of the dispersing agent (surfactant) to coat the droplets while the melt index reduction is being brought about by the catalyst. After the melt flow rate is reduced to the desired level, the temperature of the dispersion is lowered to below melting temperature of the olefin copolymer and the polymer separated from the liquid phase by filtration, centrifugation, decantation, evaporation, or the like. In a highly useful embodiment of the invention, the temperature of the dispersion is lowered to below the boiling point of the water or other liquid medium and the finely divided polymer is recovered by atmospheric or vacuum-assisted filtration. The cooling may be accomplished by removing the heating source and allowing the mixture to cool or the hot dispersion may be rapidly quenched by mixing with cold liquid which is not a solvent for the polymer. This liquid may be the same or different than that employed as the dispersing medium. Water is preferably used for this purpose. The recovered polymer is typically washed with water to remove residual surfactant and catalyst before drying.

The following examples illustrate the process of the invention and the improved powders obtained therefrom more fully. As will be apparent to those skilled in the art, numerous variations of the described procedures are possible and are within the scope of the invention. In the examples all parts and percentages are given on a weight basis unless otherwise indicated.

The powders produced in these examples were analyzed using laser light scattering to determine average particle size and particle size distribution- A Model 2600C Malvern Particle Size Analyzer with the proper lens configuration for the expected particle size to be measured and equipped to automatically calculate the distribution curve and average particle size was used. For the analysis, water is charged to the water bath and circulated through the sample measuring chamber. After obtaining the baseline measurement, the agitator and sonic vibrator are turned on and powder is added to the water bath until the obscuration reading is 0.3. Mixing and circulation are controlled to obtain acceptable dispersion without excessive foaming. A drop of liquid detergent is added to facilitate dispersion. After eight minutes agitation, measurements are taken over a period of time and the distribution curve and average particle size are calculated. Duplicate runs are made for each powder sample. The particle size reported in the examples is the number average particle size D(v, 0.5). The range reported for the particle size distribution in the examples is for 80 percent of the distribution curve. Ten percent of the powder particles will fall below the lower limit of the recited distribution and 10 percent of the powder particles will be larger than the upper recited particle size distribution limit.

Melt flow rates provided in the examples were measured in accordance with ASTM D1238-89 at 190° C. with a Tinius Olsen Extrusion Plastometer. Melt flow rates are expressed in grams per 10 minutes.

For the examples, an electrically heated two-liter Paar pressure reactor equipped with thermowell and thermocouple connected to a digital display was used. The reactor was also equipped with an agitator and a Strahman valve to permit rapid discharge of the hot dispersion. The agitator had three, six-bladed, impellers and was driven by drill press equipped with 2 HP DC variable speed motor.

EXAMPLE I

To demonstrate the improved process of the invention whereby fractional melt flow rate microfine powders are produced, 340 parts random copolymer of ethylene and vinyltriethoxysilane having a melt flow rate of 4.8 and containing 4.0% vinyltriethoxysilane was charged to a reactor with 810 parts deionized water, 97.2 parts nonionic surfactant (Pluronic ® F-98 - a block copolymer of ethylene oxide and propylene oxide of molecular weight 13500 and containing 20% propylene oxide), and 7 parts polyethylene grafted with 2% maleic anhydride (MFR 10). Based on the weight of the copolymer, the amount of surfactant and catalyst used was 28% and 2%, respectively. The reactor was sealed and the mixture heated for 52 minutes at 216° C. under 400 psi pressure. Agitation was commenced and maintained for 15 minutes. The stirrer speed was maintained at 3000–3300 rpm (tip speed 2350 to 2590 ft/min) during the 15 minute interval. The contents of the reactor were then emptied into a stainless steel tank containing approximately 5 liters cold water to precipitate the copolymer. The resulting ethylene-vinyltriethoxysilane copolymer powder was recovered by filtration and dried. The powder had a melt flow rate of 0.14, number average particle size of 62 $\mu$m and the particle size distribution ranged from 28 to 161 $\mu$m. Microscopic examination of the powder particles showed them to be spherically shaped.

EXAMPLE II

Example I was repeated except that a different catalyst was used to bring about the melt flow reduction. The amount of copolymer, water and surfactant used was identical to Example I. Five parts acetic acid (1.44% based on the copolymer) was used as the catalyst. The resulting powder had a melt flow rate of 0.11, an average particle size of 56 $\mu$m and particle size distribution ranging from 25 to 145 $\mu$m.

EXAMPLE III

Following the procedure of Example I an experiment was conducted using stearic acid as the catalyst. The amount of copolymer, water and surfactant used was the same as in that example except that 0.2 parts stearic acid (0.06% based on the weight of the copolymer) was used. The resulting microfine powder particles were spherically shaped, had a melt flow rate of 0.01, an average size of 76 $\mu$m and size distribution of 37–148 $\mu$m.

COMPARATIVE EXAMPLE A

To demonstrate the need to use a catalyst for the process of the invention, Example I was repeated except that the polyethylene grafted with maleic arthydride was omitted from the reaction. The reactant charge and reaction conditions were otherwise identical. While a fine powder was produced (average particle size 55 $\mu$m and particle size distribution 27–108 $\mu$m), the melt flow rate of the resulting ethylene-vinyltriethoxysilane powder was 4.6.

COMPARATIVE EXAMPLE B

To demonstrate the inability to disperse fractional melt flow rate polymers, 347 parts polyethylene having a melt index of 0.17 was charged to the reactor with 49 parts surfactant (Pluronic ® F-98) and 810 parts water. The mixture was heated for 52 minutes at 216° C. under 400 psi pressure and then agitated for 15 minutes at the same rate as used for Example I. When the reactor contents were discharged, essentially all of the polymer remained in the reactor. Disassembly and inspection of the reactor revealed that the polymer was agglomerated on the agitator blades. Increasing the surfactant concentration, up to as high as equal parts surfactant based on the resin, still did not produce acceptable dispersions capable of yielding fine powders.

EXAMPLE IV

To demonstrate the ability to use other ethylene-vinyltriethoxysilane copolymers, in the process of the invention, the following experiment was carried out. For the reaction, 350 parts ethylene-vinyltriethoxysilane copolymer having a melt index of 5 and containing 1.9 weight percent copolymerized vinyltriethoxysilane was charged to a reactor with 810 parts water. Twenty-eight percent surfactant (Pluronic ® F-98), based on the weight of the copolymer, and 0.06% stearic acid, based on the weight of the copolymer, were also charged to the reactor. The materials were then dispersed and the copolymer recovered in accordance with the procedure of Example I. The resulting powder comprised of spherical particles had a melt flow rate of 0.17. The average particle size of the powder was 53 $\mu$m and the particle size distribution was 27–96 $\mu$m.

When the above procedure was repeated, except that the amount of stearic acid used was doubled, comparable fractional melt flow rate microfine powders were produced. The powders had no measurable flow rate, an average particle size of 77 $\mu$m and particle size distribution ranging from 47 to 140 $\mu$m.

EXAMPLE V

Example IV was repeated using ethylene-vinyltriethoxysilane copolymer having 0.8 weight percent vinyltriethoxysilane copolymerized. The copolymer had a melt index of 6. When 0.12% stearic acid based on the amount of the copolymer was employed, the resulting spherical powder had a melt index of 0.44, an average particle size of 42 and particle size distribution of 21–72 $\mu$m. Increasing the catalyst (stearic acid) level to 0.23%, based on the weight of the copolymer, yielded a powder of melt index 0.25, average particle size of 51 $\mu$m and particle size distribution ranging from 25–125 $\mu$m.

EXAMPLE VI

The versatility of the present process is further illustrated by the following example wherein a fractional melt flow rate powder of an ethylene-vinyl acetate copolymer grafted with vinyltriethoxysilane is produced. The EVA resin contained 9% vinyl acetate and was grafted with 0.9% vinyltriethoxysilane. The graft copolymer had a melt flow rate of 23. For this example, 350 parts graft copolymer, 810 parts water, 10 parts acetic acid and 97.2 parts surfactant (Tetronic ® 908) were used. After sealing the reactor, the mixture was heated for 50 minutes at 210° C. at 350 psi pressure and then agitated for 15 minutes. The stirrer speed was maintained at 3500 rpm (tip speed 2750 ft/min). The reactor contents were then discharged into water and the resulting powder recovered by filtration and dried overnight in a hood. The melt flow rate of the polymer was reduced to 0.05 as a result of the treatment. The powder consisted of spherically shaped particles having an average particle size of 69 μm and particle size distribution ranging from 25 to 135 μm.

EXAMPLE VII

The procedure of Example VI was repeated except that lauryl amine was used as the catalyst in place of the acetic acid and Pluronic ® F-98 was substituted for Tetronic ®908. The melt flow rate of the polymer powder produced was 0.05. The number average particle size of the powder was 43 μm and particle size distribution was 18–95 μm.

EXAMPLE VIII

Example VI was repeated except that a different graft copolymer was employed. For this reaction, an EVA copolymer (9% VA) grafted with 0.3% vinyltrimethoxysilane was used. The EVA resin had a melt flow rate of 20. One part acetic acid and 97.2 parts Pluronic ® F-98 surfactant were used for this reaction. The powder produced had a melt flow rate of 0.32, average particle size of 95 μm and particle size distribution from 65 to 142 μm.

We claim:

1. A microfine powder of a partially crosslinked olefin copolymer resin having a melt flow rate less than 1 and comprised of from 80 to 99.75 weight percent $C_{2-3}$ α-olefin and from 0.25 to 20 weight percent unsaturated alkoxysilane of the formula

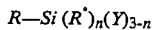

where R is an ethylenically unsaturated hydrocarbon radical having from 2 to 6 carbon atoms, R' is a hydrocarbon radical having from 1 to 10 carbon atoms, Y is an alkoxy group having from 1 to 4 carbon atoms and n is an integer from 0 to 2, characterized by having particles which are spherical or substantially spherical in shape with 80 percent or more of said particles ranging in size from 10 microns up to 200 microns.

2. The polymer powder of claim 1 wherein the unsaturated alkoxysilane is a vinyltrialkoxysilane wherein R is vinyl, n is zero and Y is an alkoxy group having from 1 to 4 carbon atoms.

3. The polymer powder of claim 2 having a melt flow rate less than 0.5 and wherein 80 percent or more of the particles range in size from 20 microns up to 150 microns.

4. The polymer powder of claim 3 wherein the vinyltrialkoxysilane is vinyltrimethoxysilane or vinyltriethoxysilane.

5. The polymer powder of claim 4 wherein the olefin copolymer is comprised of 90 to 99.5 weight percent $C_{2-3}$ α-olefin and 0.5 to 10 weight percent vinyltrialkoxysilane.

6. The polymer powder of claim 5 wherein the olefin copolymer is a graft copolymer obtained by grafting the vinyltrialkoxysilane onto an ethylene polymer backbone.

7. The polymer powder of claim 6 wherein the vinyltrialkoxysilane is vinyltrimethoxysilane.

8. The polymer powder of claim 6 wherein the vinyltrialkoxysilane is vinyltriethoxysilane.

9. The polymer powder of claim 5 wherein the olefin copolymer is a random copolymer of ethylene and the vinyltrialkoxysilane.

10. The polymer powder of claim 9 wherein the vinyltrialkoxysilane is vinyltrimethoxysilane.

11. The polymer powder of claim 9 wherein the vinyltrialkoxysilane is vinyltriethoxysilane.

12. The polymer powder of claim 1 wherein the olefin copolymer is comprised of 55 to 99.5 weight percent $C_{2-3}$ α-olefin, 0.25 to 20 weight percent unsaturated alkoxysilane and 0.25 to 45 weight percent comonomer selected from the group consisting of a vinyl ester of a $C_{2-6}$ aliphatic carboxylic acid, a $C_{1-6}$ alkyl acrylate or a $C_{1-6}$ alkyl methacrylate.

13. The polymer powder of claim 12 wherein the unsaturated alkoxysilane is a vinyltrialkoxysilane wherein R is vinyl, n is zero and Y is an alkoxy group having from 1 to 4 carbon atoms, 14. The polymer powder of claim 13 having a melt flow rate less than 0.5 and wherein 80 percent or more of the particles range in size from 20 microns up to 150 microns.

15. The polymer powder of claim 14 wherein the vinyltrialkoxysilane is vinyltrimethoxysilane or vinyltriethoxysilane.

16. The polymer powder of claim 15 wherein the olefin copolymer is comprised of 55 to 99 weight percent $C_{2-3}$ α-olefin, 0.5 to 40 weight percent vinyltrialkoxysilane and 0.5 to 40 weight percent comonomer selected from the group consisting of vinyl acetate, methyl acrylate, ethyl acrylate or butyl acrylate.

17. The polymer powder of claim 16 wherein the olefin copolymer is a graft copolymer obtained by grafting the vinyltrialkoxysilane onto an ethylene-vinyl acetate copolymer.

18. The polymer powder of claim 16 wherein the olefin copolymer is a graft copolymer obtained by grafting the vinyltrialkoxysilane onto an ethylene-n-butyl acrylate copolymer.

19. The polymer powder of claim 16 wherein the olefin copolymer is a random copolymer of ethylene, vinyl acetate and the vinyltrialkoxysilane.

20. The polymer powder of claim 16 wherein the olefin copolymer is a random copolymer of ethylene, n-butyl acrylate and the vinyltrialkoxysilane.

* * * * *